United States Patent
Ali et al.

(10) Patent No.: US 9,956,956 B2
(45) Date of Patent: May 1, 2018

(54) ADAPTIVE DRIVING SYSTEM

(71) Applicant: DENSO CORPORATION, Kariya-shi, Aichi-ken (JP)

(72) Inventors: Syed Ali, West Bloomfield, MI (US); Masayuki Imanishi, Okazaki (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 47 days.

(21) Appl. No.: 14/992,605

(22) Filed: Jan. 11, 2016

(65) Prior Publication Data

US 2017/0197618 A1    Jul. 13, 2017

(51) Int. Cl.
| | |
|---|---|
| *B60W 30/12* | (2006.01) |
| *G05D 1/02* | (2006.01) |
| *B60W 10/18* | (2012.01) |
| *G06N 99/00* | (2010.01) |
| *B60W 10/20* | (2006.01) |

(52) U.S. Cl.
CPC ............ *B60W 30/12* (2013.01); *B60W 10/18* (2013.01); *B60W 10/20* (2013.01); *G05D 1/021* (2013.01); *G06N 99/005* (2013.01); *B60W 2510/0604* (2013.01); *B60W 2510/18* (2013.01); *B60W 2510/20* (2013.01)

(58) Field of Classification Search
CPC ...... B60W 30/12; B60W 10/20; B60W 10/18; B60W 2510/0604; B60W 2510/18; B60W 2510/20; G06N 99/005; G05D 1/021
See application file for complete search history.

(56) References Cited

U.S. PATENT DOCUMENTS

| | | | | |
|---|---|---|---|---|
| 6,026,347 | A * | 2/2000 | Schuster ................... | B62D 1/28 180/167 |
| 6,873,911 | B2 * | 3/2005 | Nishira ..................... | B60T 7/16 340/436 |
| 8,219,298 | B2 * | 7/2012 | Nishira .............. | B60K 31/0008 701/1 |
| 8,634,980 | B1 * | 1/2014 | Urmson ............... | G05D 1/0055 701/23 |
| 8,665,079 | B2 * | 3/2014 | Pawlicki .................. | G06T 7/73 340/435 |

(Continued)

FOREIGN PATENT DOCUMENTS

JP       2003162799 A       6/2003

*Primary Examiner* — Khoi H Tran
*Assistant Examiner* — Majdi Alsomiri
(74) *Attorney, Agent, or Firm* — Harness, Dickey & Pierce, P.L.C.

(57) ABSTRACT

A vehicle system for a vehicle can include sensors and a controller. The sensors can detect a position and speed of the vehicle and a position and speed of an object adjacent to the vehicle's lane. The controller can determine an operational state based on input from the sensors. The controller can operate the vehicle in an autonomous mode, wherein the controller controls the speed of the vehicle and a spacing between the vehicle and the object. The controller can switch from the autonomous mode to a learning mode in response to a driver taking control of the vehicle's speed or steering. In the learning mode, the controller can learn a preferred spacing between the vehicle and the object and a preferred speed relative to the object. The controller can control the vehicle in the autonomous mode based on the preferred spacing and speed during similar operational states.

15 Claims, 4 Drawing Sheets

(56) References Cited

U.S. PATENT DOCUMENTS

| | | | | |
|---|---|---|---|---|
| 8,831,813 B1* | 9/2014 | Ferguson | B60T 7/042 | 701/23 |
| 9,304,515 B2* | 4/2016 | Cudak | G05D 1/0287 | |
| 9,429,943 B2* | 8/2016 | Wilson | G05D 1/0246 | |
| 2008/0147253 A1* | 6/2008 | Breed | B60W 30/16 | 701/3 |
| 2008/0161987 A1* | 7/2008 | Breed | G08G 1/161 | 701/27 |
| 2009/0088925 A1* | 4/2009 | Sugawara | B60W 30/12 | 701/41 |
| 2010/0023223 A1* | 1/2010 | Huang | B60W 40/09 | 701/44 |
| 2010/0023245 A1* | 1/2010 | Huang | B60W 30/12 | 701/117 |
| 2010/0052945 A1* | 3/2010 | Breed | B60N 2/2863 | 340/903 |
| 2010/0256836 A1* | 10/2010 | Mudalige | G08G 1/163 | 701/2 |
| 2011/0313665 A1* | 12/2011 | Lueke | G01S 13/931 | 701/301 |
| 2013/0184926 A1* | 7/2013 | Spero | B62D 1/28 | 701/26 |
| 2013/0231824 A1* | 9/2013 | Wilson | G05D 1/0246 | 701/26 |
| 2013/0338868 A1* | 12/2013 | Essame | B60W 30/18163 | 701/23 |
| 2014/0172221 A1* | 6/2014 | Solyom | B62D 15/0285 | 701/23 |
| 2014/0236414 A1* | 8/2014 | Droz | B60W 30/00 | 701/28 |
| 2015/0166062 A1* | 6/2015 | Johnson | B60W 30/12 | 701/41 |
| 2016/0039458 A1* | 2/2016 | Spero | B62D 1/28 | 701/25 |
| 2016/0039459 A1* | 2/2016 | Spero | B62D 1/28 | 701/25 |
| 2016/0059858 A1* | 3/2016 | Heinrich | B60W 30/18163 | 701/23 |
| 2016/0068103 A1* | 3/2016 | McNew | B60Q 9/00 | 701/23 |
| 2016/0318515 A1* | 11/2016 | Laur | G05D 1/0061 | |
| 2017/0015318 A1* | 1/2017 | Scofield | G08G 1/0112 | |

* cited by examiner

ADAPTIVE DRIVING SYSTEM

FIELD

The present disclosure relates to an adaptive driving system.

BACKGROUND

This section provides background information related to the present disclosure which is not necessarily prior art.

Autonomous or semi-autonomous vehicle control systems typically choose a straight or constant travel path for the vehicle that positions the vehicle along a center line of a lane in which the vehicle is traveling. In other words, the vehicle is equidistant from either adjacent driving lane or adjacent vehicles. Human occupants can find such a path uncomfortable during certain overtaking conditions (e.g. passing other vehicles or being passed by other vehicles).

SUMMARY

This section provides a general summary of the disclosure, and is not a comprehensive disclosure of its full scope or all of its features.

The present teachings are directed towards a vehicle system for a host vehicle traveling in a driving lane and passing objects adjacent to the driving lane.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
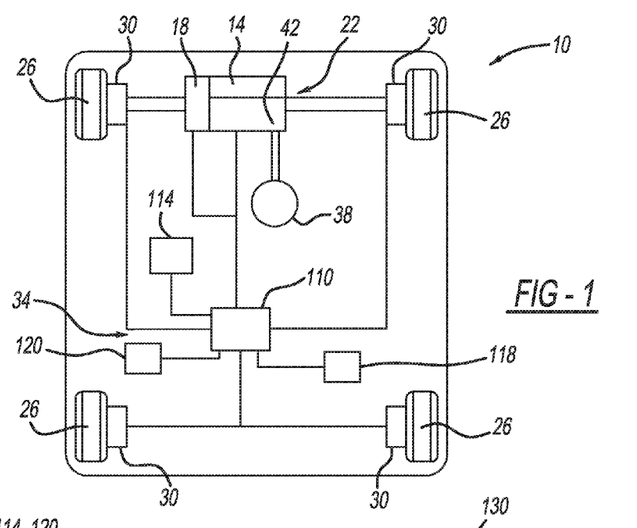
FIG. 1 is a schematic view of an example vehicle having a vehicle control system in accordance with the present teachings.

The present teachings are directed toward a vehicle system that learns a driver's preferred lateral spacing and speed relative to other vehicles in adjacent lanes. With reference to FIG. 1, an example vehicle 10 is schematically shown (hereafter referred to as the host vehicle 10). The host vehicle 10 can be any suitable type of vehicle configured to transport a person (e.g. a driver or occupant) within the host vehicle 10. The host vehicle 10 can include a power plant 14, a transmission 18, a steering mechanism 22, wheels 26, brakes 30, and a control system 34.

The power plant 14 can be any suitable type of power producing or outputting device, such as an internal combustion engine or an electric motor for example. The power plant 14 can be drivingly coupled to the transmission 18 to output rotary power thereto. The transmission 18 can be any suitable type of transmission and can be drivingly coupled to the wheels 26 to transmit rotary power thereto to propel the host vehicle 10.

The steering mechanism 22 can include a steering wheel 38 and a steering linkage 42. The steering linkage 42 can be coupled to the wheels 26 to turn the wheels 26 and steer the host vehicle 10. The steering wheel 38 can be operably coupled to the steering linkage 42. The steering wheel 38 can be configured such that the driver can operate the steering wheel 38 to steer the host vehicle 10 in a conventional manner. The brakes 30 can be any suitable braking mechanism configured to slow the rotation of the wheels 26 or reduce the power output from the power plant 14 and/or the transmission 18 to the wheels 26.

The control system 34 can include a control module 110, a display device 114, a set of sensors or at least one sensor 118, and a selection device 120. With additional reference to FIG. 2, the display device 114 can be any suitable display configured to visually communicate information to the driver of the host vehicle 10, such as through the use of text, pictures, animations, video, images, or diagrams. For example the display device 114 can be a heads-up-display or can be mounted to an instrument panel or console 122 of the host vehicle 10 that is visible to the driver. Alternatively, the display device 114 can be a mobile device that can be removable from the vehicle and in wireless communication with the host vehicle 10 (e.g. a cell phone, laptop, tablet).

Figure 2:
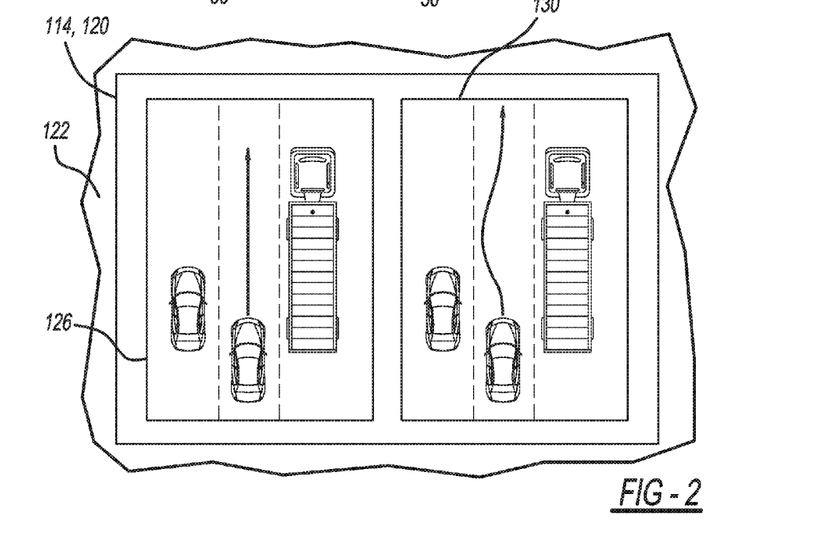
FIG. 2 is an example of a display device of the vehicle of FIG. 1.

In the example provided, the display device 114 is configured to display one or more driving or overtaking policy options 126, 130 in visual or graphical form. Alternatively or additionally, the display device 114 can notify the driver of the overtaking policy options 126, 130 using auditory cues (e.g. sounds or speech). The display device 114 can prompt the driver via any suitable method such as via push notifications within an application accessible by the display device 114. The overtaking policy options 126, 130 are described in greater detail below. The display device 114 can be interactive such that the driver can select between certain sets of information shown on the display (e.g. overtaking policy options 126, 130) in a conventional manner (e.g. touch screen, controls, or voice commands).

Returning to FIG. 1, the selection device 120 can be any suitable selection device (e.g. button, knob, or joystick) configured to receive input from the driver. For example, the selection device 120 can be used by the driver to select between the overtaking policy options 126, 130 (FIG. 2) as is discussed in greater detail below. In the example provided, the display device 114 can be a touch screen display, and thus can also be the selection device 120. Alternatively or additionally, the selection device 120 can be a voice recognition device such that the driver can orally state the desired selection and the selection device 120 can recognize the driver's spoken commands.

The sensors 118 can be configured to sense any suitable parameter of the host vehicle 10 or the environment around the host vehicle 10. For example, the sensors 118 can be configured to detect the host vehicle's 10 longitudinal speed and positioning within a driving lane. The sensors 118 can also be configured to detect the positioning of other vehicles or objects in the driving lane, the positioning of other vehicles or objects adjacent to the driving lane, the type or size of the other vehicles or objects, or the speeds of the other vehicles or objects. The sensors can be any type of sensor such as speed sensors, accelerometers, GPS sensors, cameras, inertial sensors, lasers, radar, sonar, or acoustic sensors for example. The sensors 118 can also be configured to detect other suitable criteria of the host vehicle 10 such as engine speed, throttle, steering angle of the wheels 26 or steering wheel 38, or brake pressure for example.

The control module 110 can be in communication with systems of the host vehicle 10 (e.g. the engine 14, transmission 18, brakes 30, steering mechanism 22, display 114, sensors 118, selection device 120) to send and/or receive signals therebetween. For example, the control module 110 can be configured to send signals to the brakes 30 to slow the host vehicle 10, or the steering mechanism 22 to alter the course of the host vehicle 10, or the engine 14 or transmission 18 to accelerate or decelerate the host vehicle 10. The control module 110 can be configured to receive input signals from the sensors 118 and the selection device 120 and to send output signals to the display device 114 for example. The control module 110 can also be in communication with one or more databases, memory, the internet, or networks for accessing additional information (e.g. maps, road information, weather, vehicle information). The operation of the control module 110 is described in greater detail below.

Figures 3, 4:
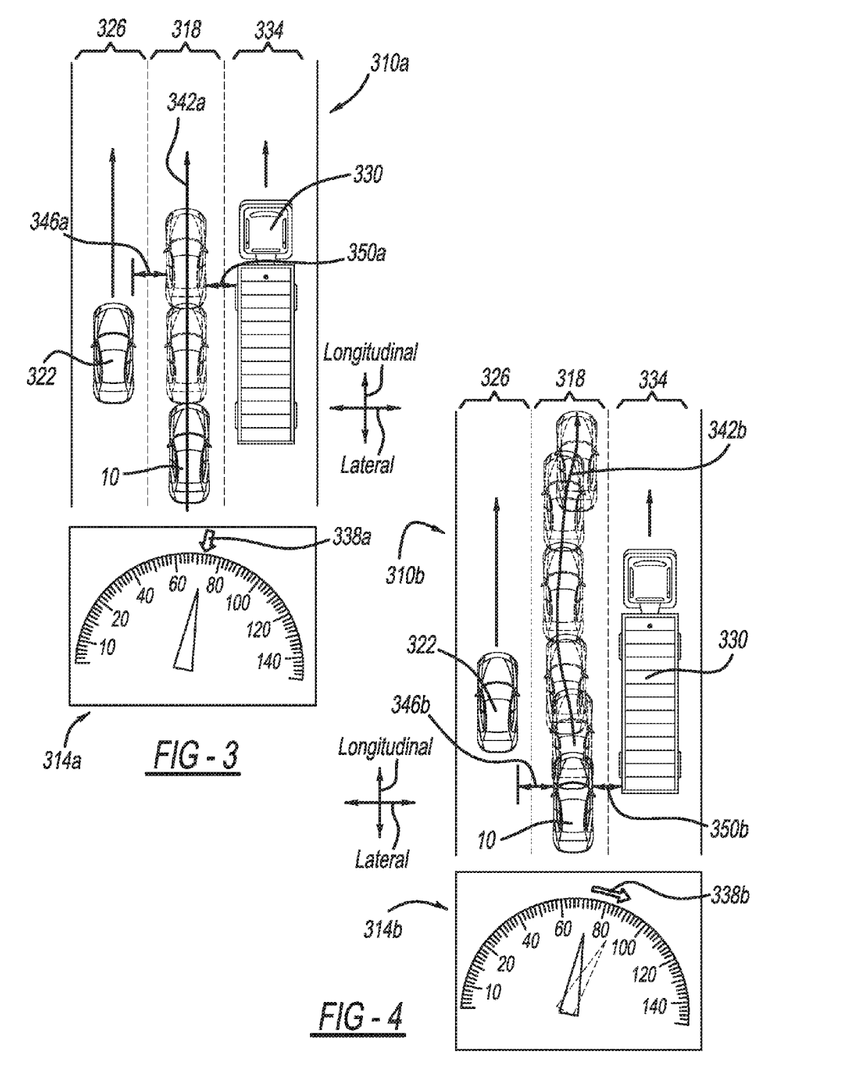
FIG. 3 illustrates an overtaking policy for when the vehicle of FIG. 1 is operated in a first overtaking condition, illustrating a planned path and speed.
FIG. 4 illustrates an overtaking policy similar to FIG. 3, illustrating an actual path and speed when controlled by a driver of the vehicle.

With additional reference to FIG. 3, an example of a planned overtaking policy 310*a* is illustrated for a first overtaking condition (i.e. an operational state or world state). The control module 110 can be configured to determine the planned overtaking policy 310*a* and the world state based on input from the sensors 118. The world state can include the speed of the host vehicle 10 (shown by speedometer 314*a*), the lateral and longitudinal positions of the host vehicle 10 within a driving lane 318, the speeds of other objects (e.g. vehicle 322 in lane 326 or vehicle 330 in lane 334), the lateral and longitudinal positions of the other objects (e.g. vehicles 322, 330), and the type or size of the other objects (e.g. vehicles 322, 330). Thus, the world state can include the speed and lateral and longitudinal positions of the host vehicle 10 relative to the vehicles 322 and 330 and can be based on the size or type of the vehicles 322, 330. While not specifically shown, the world state can also include the lateral and longitudinal positions and speeds of other objects in front of or behind the host vehicle 10 in the driving lane 318. While the example shown illustrates the objects adjacent to the driving lane 318 as vehicles 322, 330, it is understood that the objects can be other types of objects such as people, animals, construction barricades/barrels, or machinery for example. Additionally, different types of vehicles can be recognized as different world states (e.g. civilian cars versus emergency personnel vehicles). The world state can also include other information, such as road structure information (e.g., bridges, road curvature, road slope, surface material, merging and intersection locations), weather information, accident location records, vehicle average speeds records, and traffic records. This other information can be determined in real time, or can be downloaded or accessed from an external database for example.

In the example provided, the vehicle 322 is a car or small truck traveling in lane 326, though the vehicle 322 can be other types of vehicles or objects. Lane 326 can be adjacent to (e.g. immediately to the left of) the lane 318 in which the host vehicle 10 is traveling. In the example provided, the vehicle 330 is a large truck or tractor trailer traveling in lane 334, though other types of vehicles or objects can be in the lane 334. Lane 334 can be adjacent to lane 318 on an opposite side of lane 318 from lane 326 (e.g. immediately to the right of lane 318).

The planned overtaking policy 310*a* can include a planned speed 338*a* of the host vehicle 10 and a planned path 342*a* of the host vehicle 10 for passing the vehicles 322, 330 that can be calculated by the control module 110 for the purposes of the control module 110 autonomously controlling the host vehicle 10. In the example provided, the planned speed 338*a* can be the current speed of the host vehicle 10 such that the host vehicle 10 can maintain the current speed while passing the vehicles 322, 330. In the example provided, the planned path 342*a* can be such that a lateral spacing 346*a*, 350*a* between the host vehicle 10 and the vehicles 322 and 330 respectively is equidistant. The lateral spacing 346*a*, 350*a* can be the distance between the host vehicle 10 and the vehicles 322, 330 respectively, in the lateral direction. Alternatively the planned path 342*a* can be such that the host vehicle 10 remains centered within the lane 318 (i.e. the distance in the lateral direction between the vehicle host 10 and the adjacent lane 326, 334 is equidistant).

In the planned overtaking policy 310*a* shown, the host vehicle 10 can overtake or pass the vehicle 330 (e.g. the large truck) to the host vehicle's 10 right hand side, while passing the vehicle 322 (e.g. the car) to the host vehicle's 10 left hand side. The planned overtaking policy 310*a* shown includes the host vehicle 10 maintaining at its current speed 338*a* and current lateral spacing 346*a*, 350*a* relative to the vehicles 322, 330 while the host vehicle 10 passes the vehicles 322, 330.

The planned overtaking policy 310*a* can be used by the control module 110 to operate the vehicle host 10 autonomously. In an autonomous mode, the control module 110 can control the engine 14 (e.g. throttle), transmission 18, steering mechanism 22, and/or the brakes 30 without real-time input from the driver to make the host vehicle 10 follow the planned overtaking policy 310*a*.

With additional reference to FIG. 4, an example of an actual overtaking policy 310*b* is illustrated for the first overtaking condition or world state. Similar reference numerals between FIGS. 3 and 4 refer to similar features. The actual overtaking policy 310*b* can include an actual speed 338*b* of the host vehicle 10 and an actual path 342*b* of the host vehicle 10 that the host vehicle 10 actually travels when the driver of the host vehicle 10 takes manual control of the host vehicle 10 (e.g. controls the speed, the steering or both) to pass the vehicles 322, 330.

Some drivers feel uncomfortable driving past large trucks such as vehicle 330. Accordingly, as shown in FIG. 4, the actual overtaking policy 310*b* can include the host vehicle 10 accelerating to increase the speed 338*b* of the host vehicle 10 to pass the vehicle 330 more quickly than the planned overtaking policy 310*a*. Additionally or alternatively, some drivers feel less comfortable driving near large trucks such as vehicle 330 than driving near to cars such as vehicle 322. Accordingly, as shown in FIG. 4, the actual overtaking policy 310b can include the host vehicle 10 steering such that the lateral distance 350b increases and the lateral distance 346b decreases while the host vehicle 10 passes the vehicle 330. In the example provided, the lateral distances 346b and 350b can return to equidistant lengths after passing the vehicles 322, 330. It is understood that the path 342b and exact lateral distances 346b, 350b can be different than shown and can depend on the driver's comfort level with regard to the size, type, position, or speed of the vehicles 322, 330.

The control module 110 can receive signals from the sensors 118 to determine this actual overtaking policy 310b based on input from the driver. The control module 110 can be configured to record, save or store the actual overtaking policy 310b (e.g. in a database or memory of the control module 110) during a learning mode of the control module 110. The control module 110 can be configured to monitor the driver's input to the engine 14 (e.g. throttle), transmission 18, and/or steering mechanism 22 (e.g. steering wheel 38) to determine in real-time when the driver takes control of the host vehicle 10 to cause the host vehicle 10 to deviate from the planned overtaking policy 310a. When the driver causes the host vehicle 10 to deviate from the planned overtaking policy 310a by an amount that is greater than a predetermined amount, then the control module 110 can determine that the driver has taken manual control of the host vehicle 10 and can trigger the recording or storing of the actual overtaking policy 310b.

Figures 5, 6:
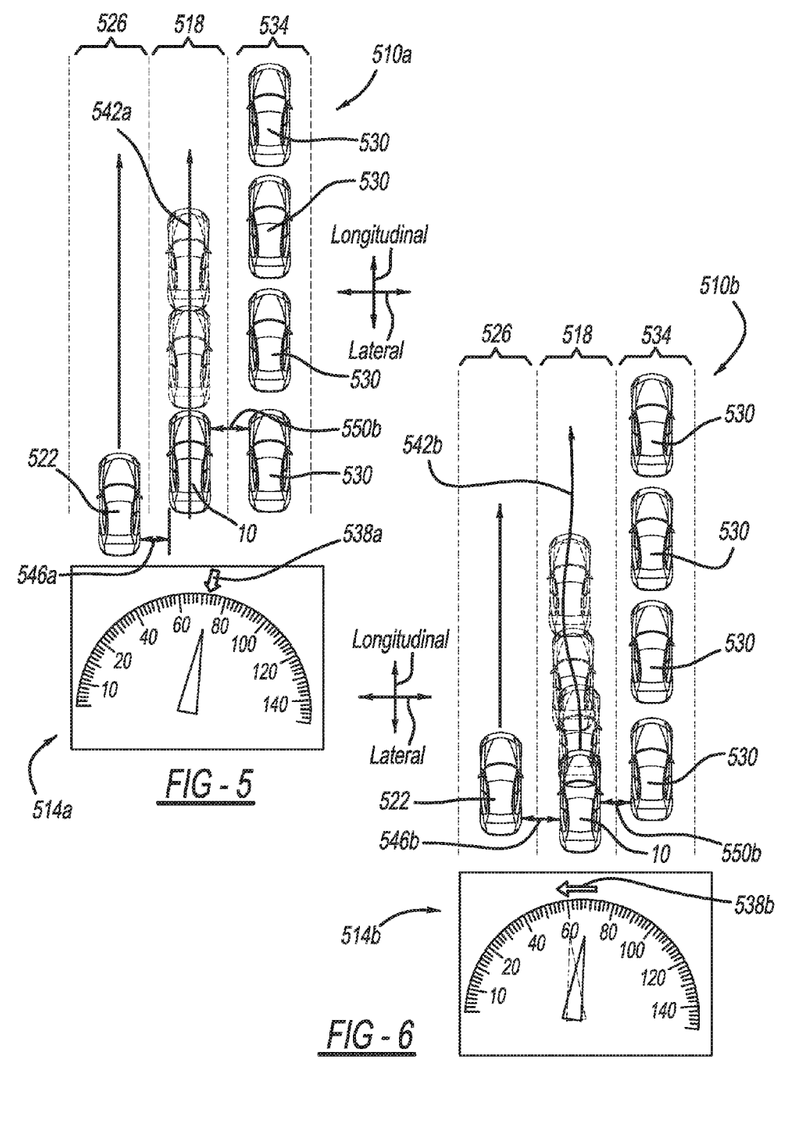
FIG. 5 illustrates an overtaking policy for when the vehicle of FIG. 1 is operated in a second overtaking condition, illustrating a planned path and speed.
FIG. 6 illustrates an overtaking policy similar to FIG. 5, illustrating an actual path and speed when controlled by a driver of the vehicle.

With additional reference to FIG. 5, an example of a planned overtaking policy 510a is illustrated for a second overtaking condition or world state. The control module 110 can be configured to determine the planned overtaking policy 510a and the world state based on input from the sensors 118. The world state can include the speed of the host vehicle 10 (shown by speedometer 514a), the lateral and longitudinal positions of the host vehicle 10 within a driving lane 518, the speeds of other objects (e.g. vehicle 522 in lane 526 or vehicles 530 in lane 534), the lateral and longitudinal positions of the other objects (e.g. vehicles 522, 530), and the type or size of the other objects (e.g. vehicles 522, 530). Thus, the world state can include the speed and lateral and longitudinal positions of the host vehicle 10 relative to the vehicles 522 and 530. While the example shown illustrates the objects adjacent to the driving lane 518 as vehicles 522, 530, it is understood that the objects can be other types of objects such as people, animals, construction barricades/barrels, or machinery for example. The world state can also include other information, such as road structure information (e.g., bridges, road curvature, road slope, surface material, merging and intersection locations), weather information, accident location records, vehicle average speeds records, and traffic records. This other information can be determined in real time, or can be downloaded or accessed from an external database for example.

In the example provided, the vehicle 522 is traveling in lane 526 at a speed similar to that of the host vehicle 10, though other speeds can be used. Lane 526 can be adjacent to (e.g. immediately to the left of) the lane 518 in which the host vehicle 10 is traveling. In the example provided, the vehicles 530 are traveling in lane 534 at a speed that is significantly less than the host vehicle 10, or the vehicles 530 can be stopped or parked. For example lane 534 can be a parking lane, or traffic congestion in lane 534 can cause the vehicles 530 to travel significantly slower than in lane 518. Lane 534 can be adjacent to lane 518 on an opposite side of lane 518 from lane 526 (e.g. immediately to the right of lane 518).

The planned overtaking policy 510a can include a planned speed 538a of the host vehicle 10 and a planned path 542a of the host vehicle 10 for passing the vehicles 530 that can be calculated by the control module 110 for the purposes of the control module 110 autonomously controlling the host vehicle 10. In the example provided, the planned speed 538a can be the current speed of the host vehicle 10 such that the host vehicle 10 can maintain the current speed while passing the vehicles 530. In an alternative example, if the host vehicle 10 is not traveling at the speed limit for the lane 518 (e.g. the host vehicle 10 is traveling below the speed limit), then the planned speed can include the host vehicle 10 accelerating to the speed limit for the lane 518. In the example provided, the planned path 542a can be such that a lateral spacing 546a, 550a between the host vehicle 10 and the vehicles 522 and 530 respectively is equidistant. The lateral spacing 546a, 550a can be the distance between the host vehicle 10 and the vehicles 522, 530 respectively, in the lateral direction. Alternatively the planned path 542a can be such that the host vehicle 10 remains centered within the lane 518 (i.e. the distance in the lateral direction between the host vehicle 10 and the adjacent lane 526, 534 is equidistant).

In the planned overtaking policy 510a shown, the host vehicle 10 can overtake or pass the vehicles 530 (e.g. the slow or stopped vehicles) to the host vehicle's 10 right hand side, while travelling adjacent to the vehicle 522 to the host vehicle's 10 left hand side. The planned overtaking policy 510a shown includes the host vehicle 10 maintaining at its current speed 538a and current lateral spacing 546a, 550a relative to the vehicles 522, 530 while the host vehicle 10 passes the vehicles 530.

The planned overtaking policy 510a can be used by the control module 110 to operate the host vehicle 10 autonomously. In an autonomous mode, the control module 110 can control the engine 14 (e.g. throttle), transmission 18, steering mechanism 22, and/or the brakes 30 without real-time input from the driver to make the host vehicle 10 follow the planned overtaking policy 510a.

With additional reference to FIG. 6, an example of an actual overtaking policy 510b is illustrated for the second overtaking condition or world state. Similar reference numerals between FIGS. 5 and 6 refer to similar features. The actual overtaking policy 510b can include an actual speed 538b of the host vehicle 10 and an actual path 542b of the host vehicle 10 that the host vehicle 10 actually travels when the driver of the host vehicle 10 takes manual control of the host vehicle 10 (e.g. controls the speed, the steering or both) to pass the vehicles 530.

Some drivers feel uncomfortable driving past slow or stopped vehicles such as vehicles 530, and would prefer to have more reaction time in case one of the vehicles 530 opens a door or attempts to enter lane 518. Accordingly, as shown in FIG. 6, the actual overtaking policy 510b can include the host vehicle 10 decelerating to decrease the speed 538b of the host vehicle 10 below that of the planned overtaking policy 510a. Additionally or alternatively, some drivers feel less comfortable driving near slow or stopped vehicles such as vehicle 530 and would prefer more spacing between their host vehicle 10 and the vehicles 530. Accordingly, as shown in FIG. 6, the actual overtaking policy 510b can include the host vehicle 10 steering such that the lateral distance 550b increases and the lateral distance 546b decreases while the host vehicle 10 passes the vehicles 530. It is understood that the path 542b and exact lateral distances 546b, 550b can be different than shown and can depend on the driver's comfort level with regard to the size, type, position, or speed of the vehicles 522, 530.

The control module 110 can receive signals from the sensors 118 to determine this actual overtaking policy 510*b* based on input from the driver. The control module 110 can be configured to record, save or store the actual overtaking policy 510*b* (e.g. in a database or memory of the control module 110). The control module 110 can be configured to monitor the driver's input to the engine 14 (e.g. throttle), transmission 18, and/or steering mechanism 22 (e.g. steering wheel 38) to determine in real-time when the driver takes control of the host vehicle 10 to cause the host vehicle 10 to deviate from the planned overtaking policy 510*a*. When the driver causes the host vehicle 10 to deviate from the planned overtaking policy 510*a* by an amount that is greater than a predetermined amount, then the control module 110 can determine that the driver has taken manual control of the host vehicle 10 and can trigger the recording or storing of the actual overtaking policy 510*b*.

Figure 7:
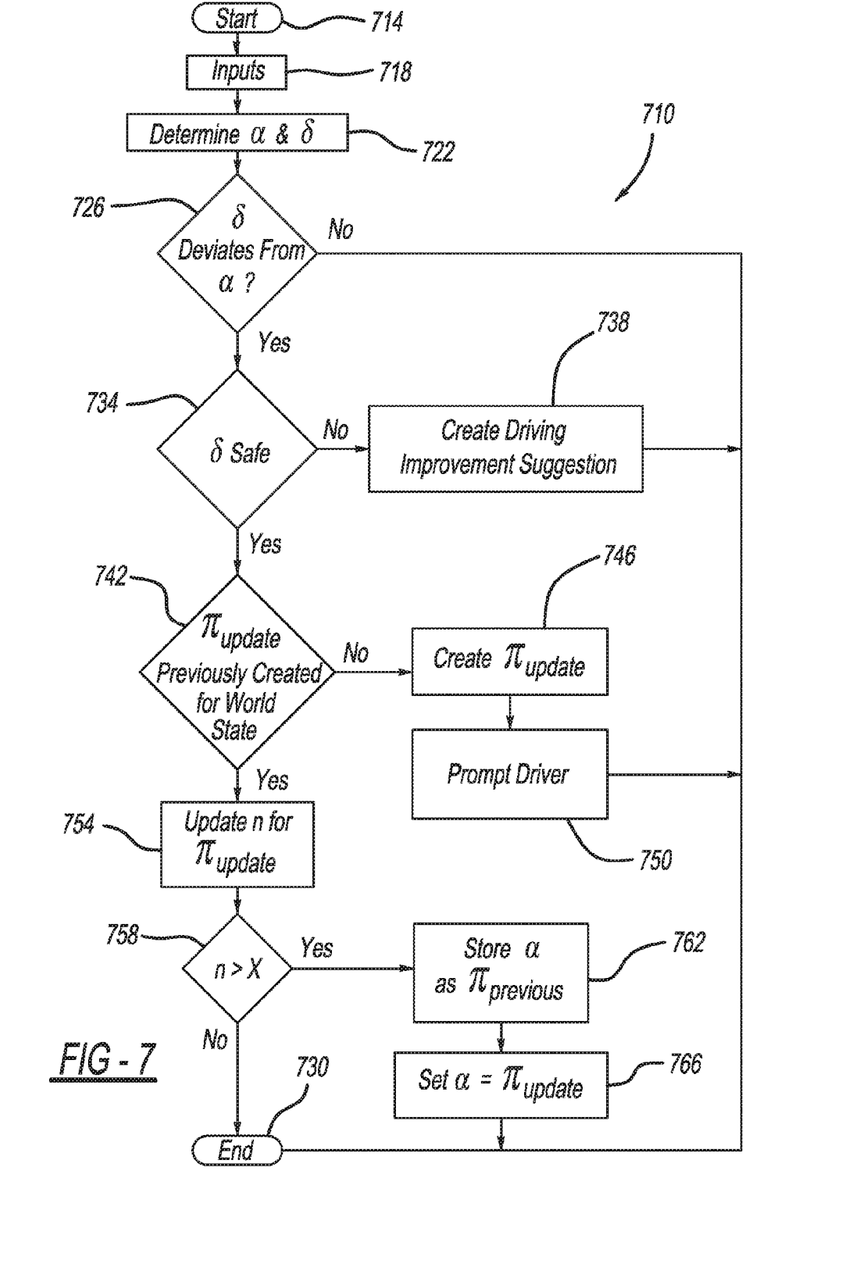
FIG. 7 is a logic routine in flow chart form for use by a control module for controlling the vehicle of FIG. 1.

With additional reference to FIG. 7, a logic routine 710 that can be used by or programmed into the control module 110 is shown in flow chart form. The logic routine 710 can begin at step 714 and proceed to step 718. At step 718, the control module 110 can receive inputs from the sensors 118. After the control module 110 receives inputs from the sensors 118, the logic routine 710 can proceed to step 722.

At step 722, the control module 110 can determine the world state and the planned overtaking policy α (e.g. planned overtaking policy 310*a* or 510*a*) for the current world state. The control module 110 can look up the planned overtaking policy α in a look-up table of previously used or pre-programmed overtaking policies, for example. Alternatively, the control module 110 can derive the planned overtaking policy α based on artificial intelligence routines or based on extrapolations or equations and the overtaking policies for the next closest world states to the current world state (i.e. world states that are different from the current world state).

At step 722, the control module 110 can also determine if the driver is manually controlling the host vehicle 10. If the driver is not manually controlling the host vehicle 10, then the control module 110 can autonomously control the host vehicle 10 to follow the planned overtaking policy α until the planned overtaking policy α is completed or until the driver takes manual control of the host vehicle 10. If the driver takes manual control of the host vehicle 10, then the control module can determine and record or store the actual overtaking policy δ (e.g. actual overtaking policy 310*b* or 510*b*). After the control module 110 determines the planned overtaking policy α and the actual overtaking policy δ, the logic routine 710 can proceed to step 726.

At step 726, the control module 110 can determine if the actual overtaking policy δ deviates from the planned overtaking policy α by an amount greater than a predetermined amount. If the actual overtaking policy δ does not deviate from the planned overtaking policy α, then the logic routine 710 can proceed to step 730 and end. If the actual overtaking policy δ deviates from the planned overtaking policy α, then the logic routine 710 can proceed to step 734.

At step 734, the control module 110 can determine if the actual overtaking policy δ is within predetermined safety levels. The control module 110 can compare aspects of the actual overtaking policy δ to predetermined safety thresholds to determine if the actual overtaking policy δ is within predetermined safety levels. For example, the predetermined safety thresholds can be threshold limits for acceleration, deceleration, speed, lateral g-force, steering rate, or lateral or longitudinal distances between the host vehicle 10 and other objects. If the actual overtaking policy is not within the predetermined safety levels, then the logic routine 710 can proceed to step 738.

At step 738, the control module 110 can create an entry in a driving log or can notify the driver (e.g. via the display device 114) that the overtaking policy δ was outside the predetermined safety levels. The control module 110 can also be configured to suggest (e.g. via the display device 114) to the driver alternative overtaking policies that would be within the predetermined safety levels. After step 738, the logic routine can proceed to step 730 and end.

Returning to step 734, if the actual overtaking policy δ is within the predetermined safety levels, then the logic routine 710 can proceed to step 742. At step 742, the control module 110 can determine if an updated overtaking policy π_update exists for a similar world state (e.g. a similar previously recorded or stored actual overtaking policy δ exists for the similar world state). If an updated overtaking policy π_update (e.g. an actual overtaking policy δ for a similar world state) has not been stored, then the logic routine 710 can proceed to step 746.

At step 746, the control module 110 can store the actual overtaking policy δ as the updated overtaking policy π_update. After step 746, the logic routine 710 can proceed to step 750. At step 750, the control module 110 can inform the driver of the storage of the updated overtaking policy π_update and can prompt the driver to choose between the overtaking policies (e.g. the planned overtaking policy α, the updated overtaking policy π_update). For example, the prompt can be similar to that described above with reference to FIG. 2 with the planned overtaking policy α and the updated overtaking policy π_update corresponding to the overtaking policy options 126, 130. Additionally, if the control module 110 had difficulty determining the world state, the prompt can ask the driver to confirm the accuracy of the world state. If the driver chooses one of the overtaking policies, then the control module 110 can set that chosen overtaking policy as the planned overtaking policy α for use in autonomous mode when the host vehicle 10 next encounters a similar world state. After step 750, the logic routine 710 can proceed to step 730 and end.

Returning to step 742, if an updated overtaking policy π_update (e.g. an actual overtaking policy δ for a similar world state) has been stored, then the logic routine 710 can proceed to step 754. At step 754, the control module 110 can increase a confidence value n for the π_update. The confidence value n can be representative of the number of times that the driver has chosen to manually follow a similar actual overtaking policy δ (e.g. the π_update) for the similar world state. In other words, the more times the driver responds to a particular world state with similar speed and lateral spacing, the higher the confidence value n. After increasing the confidence value n, the logic routine 710 can proceed to step 758.

At step 758, the control module 110 can determine if the confidence value n is greater than a predetermined confidence threshold X. If the confidence value n is not greater than a predetermined confidence threshold X, then the logic routine 710 can proceed to step 730 and end. If the confidence value n is greater than the predetermined confidence threshold X, then the logic routine 710 can proceed to step 762.

At step 762, the control module 110 can store the current planned overtaking policy α as a previous overtaking policy π_previous. It is understood that the control module 110 can store and retain a plurality of different, previous overtaking policies $\pi\_previous$. After step 762, the logic routine 710 can proceed to step 766.

At step 766, the control module 110 can set the updated overtaking policy $\pi\_update$ as the planned overtaking policy $\alpha$ for use in autonomous mode when the host vehicle 10 next encounters a similar world state. After step 766, the logic routine 710 can proceed to step 730 and end.

Thus in operation, the host vehicle 10 can be traveling in autonomous mode when the host vehicle 10 encounters an overtaking condition or world state. The host vehicle 10 can determine a planned overtaking policy 310*a*, 510*a*, $\alpha$ based on the world state. The host vehicle 10 can then continue to travel in autonomous mode according to the planned overtaking policy 310*a*, 510*a*, $\alpha$ until the driver manually controls the host vehicle 10 to deviate from the planned overtaking policy 310*a*, 510*a*, $\alpha$. The control system 34 can monitor the driver's actual overtaking policy 310*b*, 510*b*, $\delta$. Then, at a safe time (e.g. the next time the driver turns on the host vehicle 10), the control system 34 can prompt the driver to select a preferred overtaking policy for the host vehicle 10 to autonomously follow when encountering similar world states. The driver can have the option of selecting, ignoring or rejecting the observed actual overtaking policy 310*b*, 510*b*, $\delta$ for future autonomous use.

Alternatively, the control system 34 can automatically modify future planned overtaking policies such that future autonomous operation of the host vehicle 10 can comply with the driver's preferences as a result of repeated similar maneuvers by the driver (i.e. repeated similar actual overtaking policies 310*b*, 510*b*, $\delta$).

The driver can also have the option to change the preferred overtaking policy or revert back to previously saved or archived overtaking policies.

Thus, the control system 34 is capable of learning the driver's preferences (i.e. actual overtaking policy 310*b*, 510*b*, $\delta$) for speed 338*b*, 538*b* and lateral spacing 346*b*, 350*b*, 546*b*, 550*b* relative to objects or vehicles 322, 330, 522, 530 that are adjacent to the lane 318, 518 in which the host vehicle 10 is traveling. The control system 34 is capable of learning these preferences based on the driver taking over control of the host vehicle 10 during automated operation of the host vehicle 10.

After learning the driver's preferences, the control module 110 can then operate the host vehicle 10, during subsequent encounters with similar world states, such that the host vehicle 10 autonomously overtakes other objects or vehicles in accordance with the driver's preferred speed and lateral spacing. It is understood that since the actual overtaking policies 310*b*, 510*b*, $\delta$ are based on individual driver's preferences, two different host vehicles 10 can follow different speeds and paths during similar world states. The control system 34 can also be configured to differentiate between different drivers who may operate the same host vehicle 10 and to use the particular driver's overtaking preferences when that driver is operating the host vehicle 10.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A vehicle system for a host vehicle traveling in a driving lane with an object adjacent to the driving lane, the vehicle system comprising:
    a set of sensors being configured to detect a position and a speed of the host vehicle within the driving lane, and to detect a position and a speed of the object adjacent to the driving lane; and
    a control system configured to determine an operational state based on input from the sensors, to operate the host vehicle in an autonomous mode wherein the control system controls the speed of the host vehicle and a spacing between the host vehicle and the object, and to switch from the autonomous mode to a learning mode in response to the driver taking control of the speed or steering of the host vehicle;
    wherein when in the learning mode, the control system learns a preferred spacing between the host vehicle and the object and a preferred speed of the host vehicle relative to the object;
    wherein the control system is configured to control the host vehicle in the autonomous mode based on the preferred spacing and preferred speed during similar operational states; and
    wherein the control system is configured to notify the driver of a change in an overtaking policy and to prompt the driver to accept or reject the change.

2. The vehicle system of claim 1, wherein when the control system is operated in the autonomous mode, the control system is configured to control a steering input of the host vehicle to control a lateral spacing between the host vehicle and the object, wherein when in the learning mode, the control system is configured to learn a preferred lateral spacing between the host vehicle and the object, and wherein the control system is configured to control the host vehicle in the autonomous mode based on the preferred lateral spacing during similar operational states.

3. The vehicle system of claim 2, wherein the operational states are overtaking conditions.

4. The vehicle system of claim 1, wherein the control system is configured to prompt the driver to select a preferred overtaking policy from a selection of overtaking policies that includes a planned overtaking policy and a previously saved actual overtaking policy, and wherein in response to the driver selecting the preferred overtaking policy, the control system is configured to set the preferred overtaking policy as the planned overtaking policy for operation in autonomous mode during similar operational states.

5. The vehicle system of claim 1, wherein the control system is configured to prompt the driver to accept or reject the change in response to the driver starting the vehicle.

6. A vehicle system for a host vehicle traveling in a driving lane with an object adjacent to the driving lane, the vehicle system comprising:
- a set of sensors being configured to detect a position and a speed of the host vehicle within the driving lane, and to detect a position and a speed of the object adjacent to the driving lane; and
- a control system configured to determine an operational state based on input from the sensors, to operate the host vehicle in an autonomous mode wherein the control system controls the speed of the host vehicle and a spacing between the host vehicle and the object, and to switch from the autonomous mode to a learning mode in response to the driver taking control of the speed or steering of the host vehicle;
- wherein when in the learning mode, the control system learns a preferred spacing between the host vehicle and the object and a preferred speed of the host vehicle relative to the object;
- wherein the control system is configured to control the host vehicle in the autonomous mode based on the preferred spacing and preferred speed during similar operational states; and
- wherein the control system is configured to store multiple overtaking policies for a particular operational state and to prompt the driver to choose a preferred overtaking policy from a list including the multiple overtaking policies.

7. The vehicle system of claim 1, wherein the set of sensors are configured to detect a type or a size of the object, and wherein the operational state includes the type or size of the object.

8. A method of controlling a host vehicle traveling in a driving lane with an object adjacent to the driving lane, the method comprising:
- detecting a first operational state including a position and speed of the host vehicle relative to the object;
- determining a planned overtaking policy based on the first operational state;
- operating the host vehicle in an autonomous mode according to the planned overtaking policy;
- operating the host vehicle in a learning mode in response to a driver taking over control during the autonomous mode;
- storing an actual overtaking policy based on the first operational state and input from the driver during the learning mode; and
- operating the host vehicle in the autonomous mode based on the actual overtaking policy in response to the vehicle encountering operational states similar to the first operational state; and
- prompting the driver to select a preferred overtaking policy from a selection of overtaking policies corresponding to the first operational state.

9. The method of claim 8, wherein the planned overtaking policy includes a planned lateral spacing between the host vehicle and the object, and the actual overtaking policy includes an actual lateral spacing between the host vehicle and the object.

10. The method of claim 8, wherein the selection of overtaking policies includes the planned overtaking policy and the actual overtaking policy.

11. The method of claim 10, further comprising:
- operating the host vehicle in the autonomous mode based on the preferred overtaking policy in response to the host vehicle encountering operational states similar to the first operational state.

12. The method of claim 8, further comprising:
- determining if the actual overtaking policy is within predetermined safety levels; and
- wherein the host vehicle is only operated in the autonomous mode based on the actual overtaking policy when the actual overtaking policy is within the predetermined safety levels.

13. The method of claim 8, further comprising:
- determining a preferred overtaking policy for a second operational state based on actual overtaking policies corresponding to operational states that differ from the second operational state.

14. The method of claim 8, wherein the first operational state includes at least one of a type of the object, road structure information, weather information, accident records, vehicle average speed records, or traffic records.

15. A method of controlling a host vehicle traveling in a driving lane, the method comprising:
- detecting a first operational state that includes a lateral spacing of the host vehicle relative to an object adjacent to the driving lane, a speed of the host vehicle relative to the object, and a size or a type of the object;
- determining a planned overtaking policy for overtaking the object, the planned overtaking policy including a planned lateral spacing and a planned speed of the host vehicle relative to the object;
- operating the host vehicle in an autonomous mode according to the planned overtaking policy;
- detecting an actual overtaking policy based on manual input by a driver during the autonomous mode, the actual overtaking policy including an actual lateral spacing and an actual speed of the host vehicle relative to the object;
- storing the actual overtaking policy in a database of overtaking policies; and
- operating the host vehicle in the autonomous mode according to a preferred overtaking policy that is based on the actual overtaking policy in response to the host vehicle encountering a second operational state that is similar to the first operational state; and
- prompting the driver to select the preferred overtaking policy from a selection of overtaking policies.

* * * * *

UNITED STATES PATENT AND TRADEMARK OFFICE
CERTIFICATE OF CORRECTION

PATENT NO. : 9,956,956 B2
APPLICATION NO. : 14/992605
DATED : May 1, 2018
INVENTOR(S) : Ali et al.

Page 1 of 1

It is certified that error appears in the above-identified patent and that said Letters Patent is hereby corrected as shown below:

On the Title Page

Column 1, (72) Inventors, Line 2, delete "Okazaki" and insert --Okazaki-shi, Aichi-ken-- therefor Column 1, (73) Assignee, Lines 1-2, delete "Kariya, Aichi-pref." and insert --Kariya-shi, Aichi-ken-- therefor Signed and Sealed this
Eighteenth Day of September, 2018

Andrei Iancu
*Director of the United States Patent and Trademark Office*